United States Patent [19]

Sakuragi et al.

[11] Patent Number: 5,382,100

[45] Date of Patent: Jan. 17, 1995

[54] TAPE PRINTING DEVICE WITH JUSTIFICATION OF MULTISIZED CHARACTERS

[75] Inventors: Shoji Sakuragi, Nagoya; Minako Ishida, Ama; Sachiyo Nagase, Nishikasugai, all of Japan

[73] Assignee: Brother Kogyo Kabushiki Kaisha, Aichi, Japan

[21] Appl. No.: 79,109

[22] Filed: Jun. 17, 1993

[30] Foreign Application Priority Data

Jun. 17, 1992 [JP] Japan .................................. 4-184345

[51] Int. Cl.⁶ .............................................. B41J 19/14
[52] U.S. Cl. ..................................... 400/9; 400/615.2; 395/102
[58] Field of Search ........................ 400/1, 3, 9, 10, 12, 400/615.2; 364/225.7; 395/102, 110

[56] References Cited

U.S. PATENT DOCUMENTS 5,230,572  7/1993  Hirono .................................. 400/9

Primary Examiner—David A. Wiecking
Assistant Examiner—Steven S. Kelley
Attorney, Agent, or Firm—Kane, Dalsimer, Sullivan, Kurucz, Levy, Eisele and Richard

[57] ABSTRACT

A wordprocessing device which comprises a keyboard for inputting a plurality of characters; a character size key for selecting the size of the characters, a justification key to justify the characters input from the keyboard. When a character string that comprises characters having different character sizes, is to be justified, the determination of tile justify space to be Inserted between adjacent characters depends on the size of the respective adjacent characters.

9 Claims, 9 Drawing Sheets

1234567890

ABC DEF GH

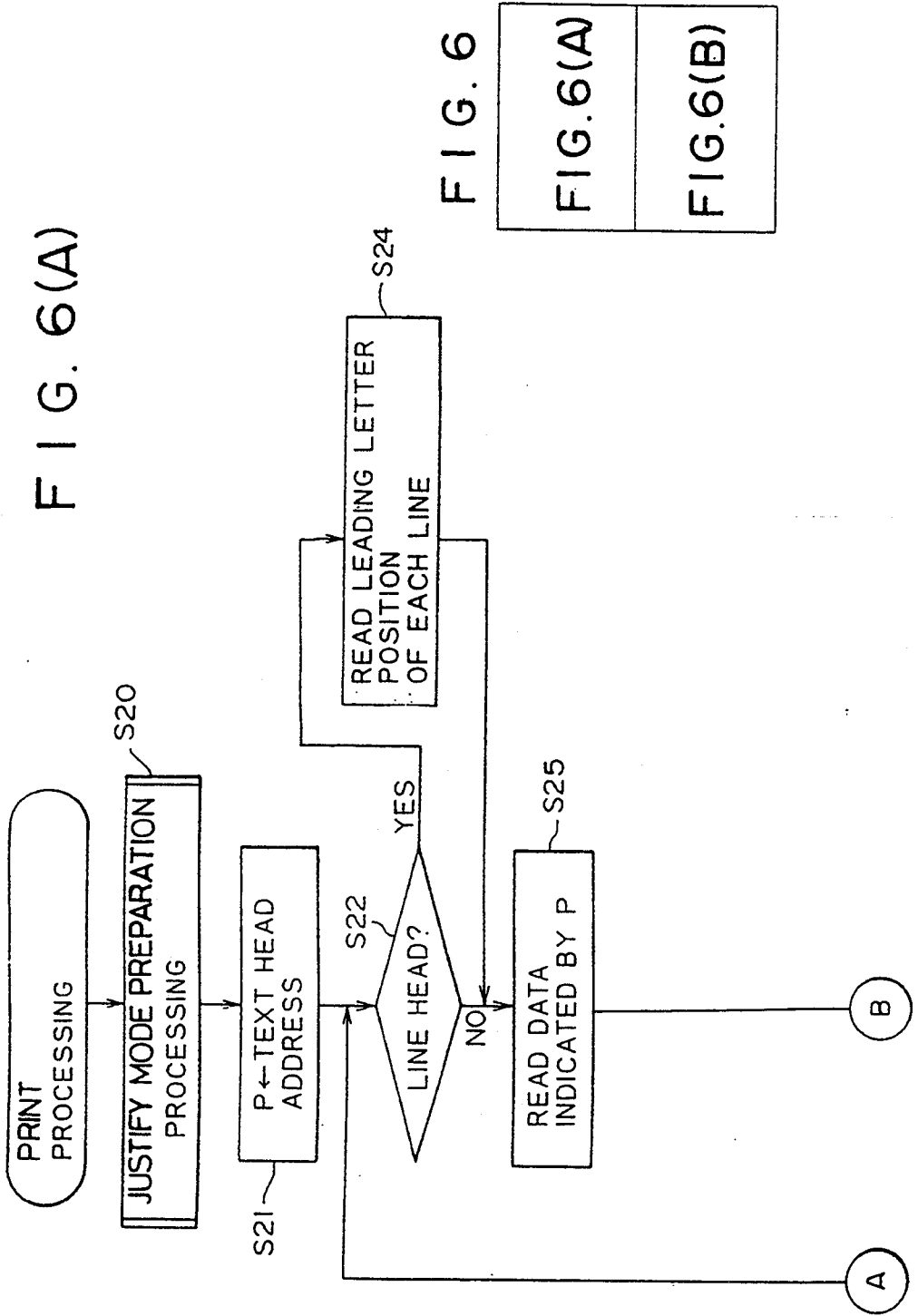

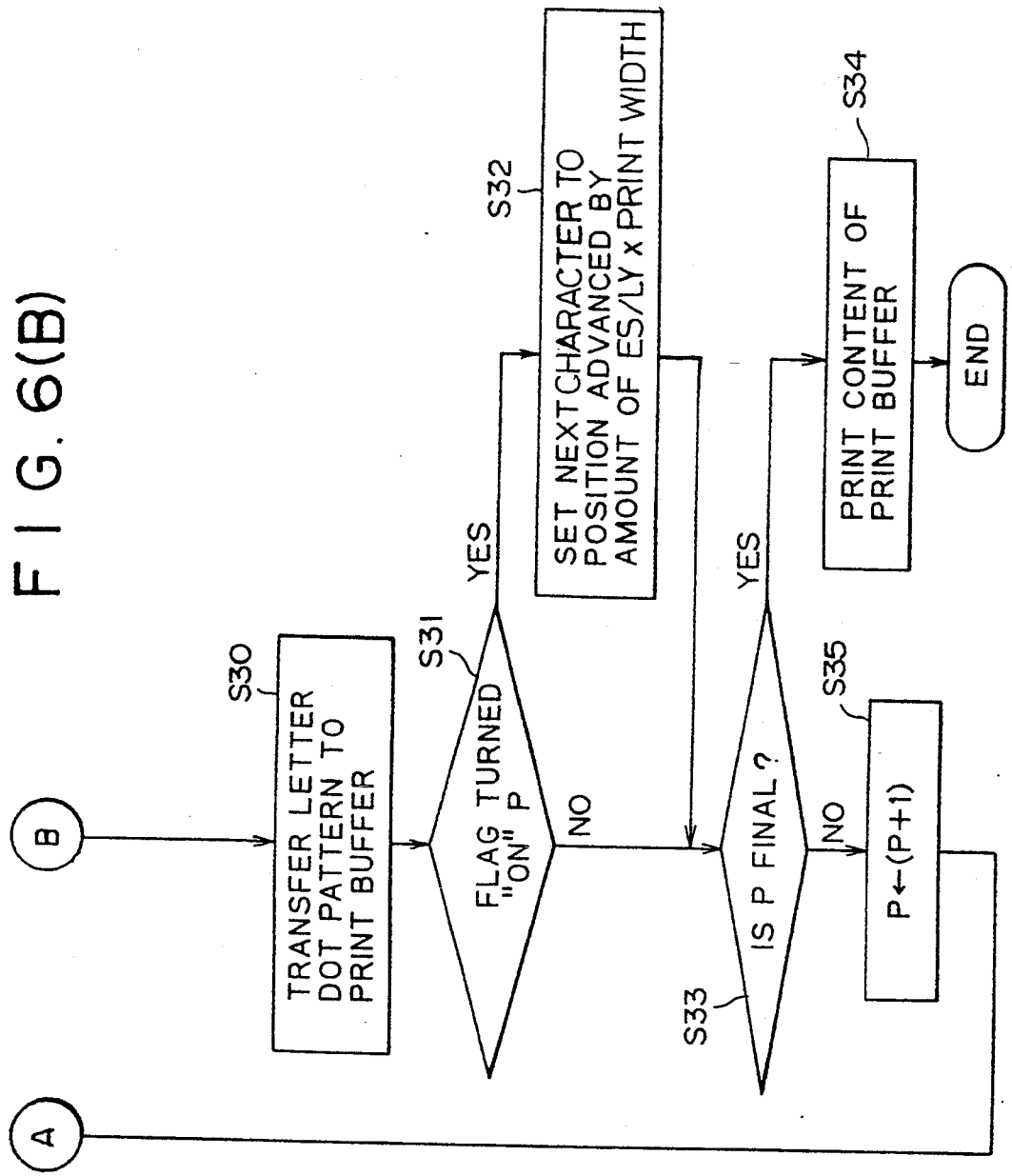

FIG. 8(B) 1234567890
A B C DEF G H

TAPE PRINTING DEVICE WITH JUSTIFICATION OF MULTISIZED CHARACTERS

FIELD OF THE INVENTION

The present invention relates to a wordprocessing device, and more particularly to a tape printing device, capable of properly justifying the characters on a plurality of lines, input from a keyboard, in which characters having different character sizes are mixedly arranged on the same line.

BACKGROUND OF THE INVENTION

Conventionally, when justification is executed in an English language typewriter etc., the difference in length between the longest line and each line had been uniformly distributed between each pair of adjacent words.

On the other hand, in a tape printing device etc., characters having different sizes may be mixedly arranged on a line. In this case however, justification is executed in the manner employed by the conventional typewriter, over the character lines including the wherein characters having different character sizes mixedly arranged. Thus an equal space interval is inserted between every pair of adjacent characters on the same line regardless of the sizes of the characters.

As a result the same space is Inserted between adjacent large-sized characters, adjacent small-sized characters, and adjacent characters having different sizes. The result is text which has an unbalanced appearance.

Further, when characters having different character sizes are mixedly arranged on the same line, justification of characters becomes very complex, with the conventional print devices not able to properly execute tills type of processing.

SUMMARY OF THE INVENTION

It is therefore an object of the present invention to provide a wordprocessing device, and more particularly, a tape printing device, capable of executing proper justification even when characters having different character sizes are mixedly arranged on the same line.

For the above purpose, according to the present invention, there is provided a wordprocessing device wherein characters having different character sizes are able to be mixedly arranged on a line, said device comprises:

justifying means for justifying a plurality of characters over a plurality of lines by inserting; additional space between respective pairs of adjacent characters on respective lines to be justified;

first means for determining total space to be distributed over each line of said plurality of lines: and second means for determining the additional space to be inserted between each pair of characters on each line, based upon the total space determined by said first determining means, as well as upon the character sizes of said pair of characters.

DESCRIPTION OF THE DRAWINGS

FIG. 6 shows the relationship between FIGS. 6A and 6B;

FIGS. 6A and 6B are flowcharts of a print processing control program;

FIG. 8(B) is a diagram Illustrating a print example printed by a tape print device embodying the invention.

DESCRIPTION OF THE EMBODIMENTS

The present invention will be described based on an embodiment of a tape print device embodying the present invention with reference to drawings.

Figure 1:
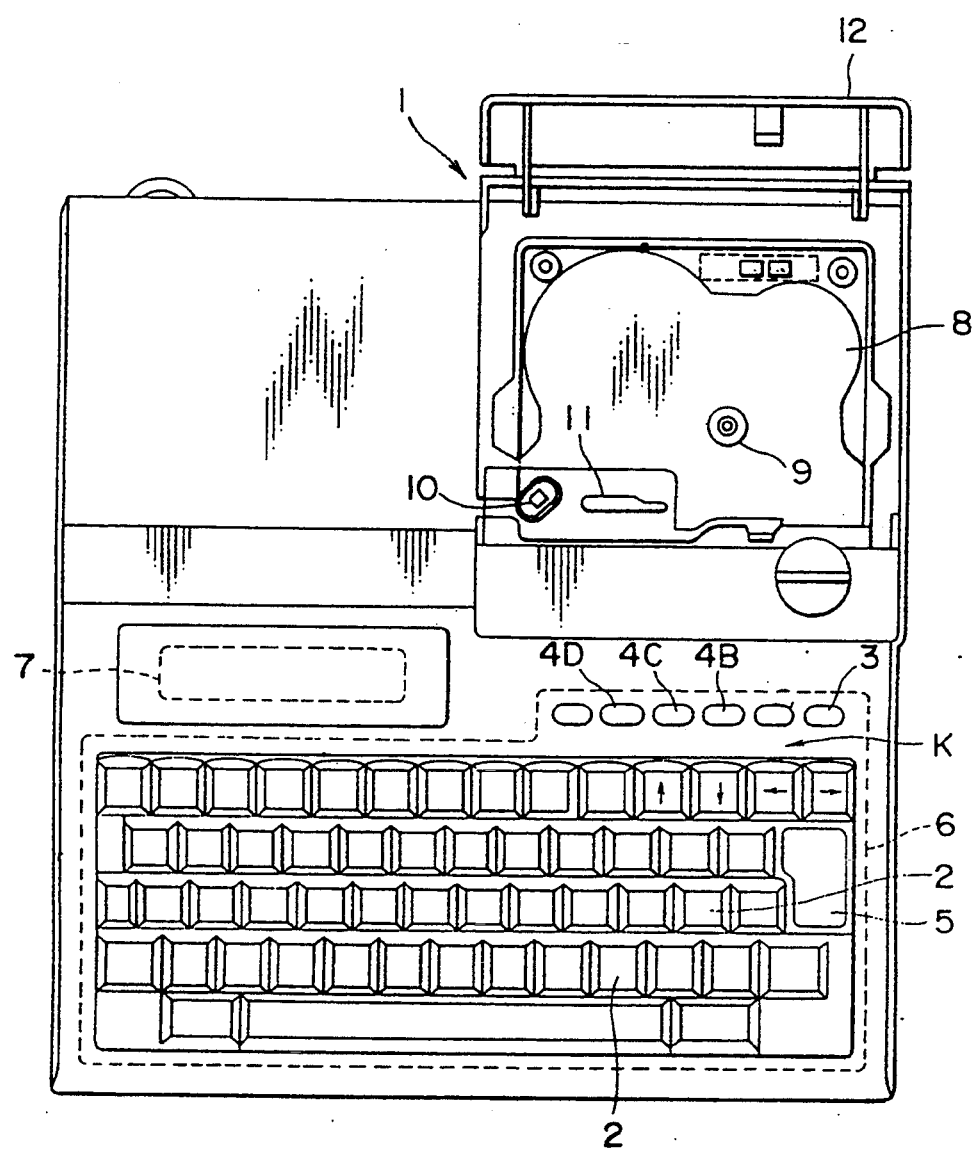
FIG. 1 is a top view of a tape print device shown by opening the cover of a tape cassette accommodation unit.

FIG. 1 is a top view of a tape printing device shown by opening the accommodation cover of a tape cassette accommodation unit. In FIG. 1, a tape print device 1 includes a keyboard 6, a liquid crystal display unit 7 for displaying characters input from the keyboard 6, and cassette accommodation unit 8 for accommodating a tape cassette 13 (described later). The keyboard 6 includes various keys such as character input keys 2 for inputting characters such as characters over a plurality of lines: a print key 3; a character size change key 4B For changing the size of some of the characters; cursor keys For moving a cursor to the right, left up and down: a justify mode setting key 4C for justifying a selected character string; an outline key 4D for modifying characters to a so-called enclosed form; a return key 5 for instructing a line feed, and the execution of other processing.

Further, a ribbon winding shaft 9 is positioned vertically in the cassette accommodation unit 8. The ribbon winding shaft 9 is driven by a pulse motor (not shown) to rotate a ribbon winding spool 21 of a tape cassette 13, and thus wind a thermal ink ribbon 17. In addition, a tape feed roller shaft 10 stands obliquely above (on the keyboard 6 side) the ribbon winding shaft 9 and is driven In rotation by a tape feed motor 40 to be described later through a suitable transmission mechanism to rotate a tape feed roller 27, as described later.

Further, a thermal head 11 for printing characters on a film tape 15 (described later) through the thermal ink ribbon 17 is located in front of the cassette accommodation unit 8. In addition, the cassette accommodation unit 8 is opened and closed by an accommodation cover 12 rotatably supported behind the tape print device 1. The exchange of the tape cassette 13, is enabled when the accommodation cover 12 is opened.

Figure 2:
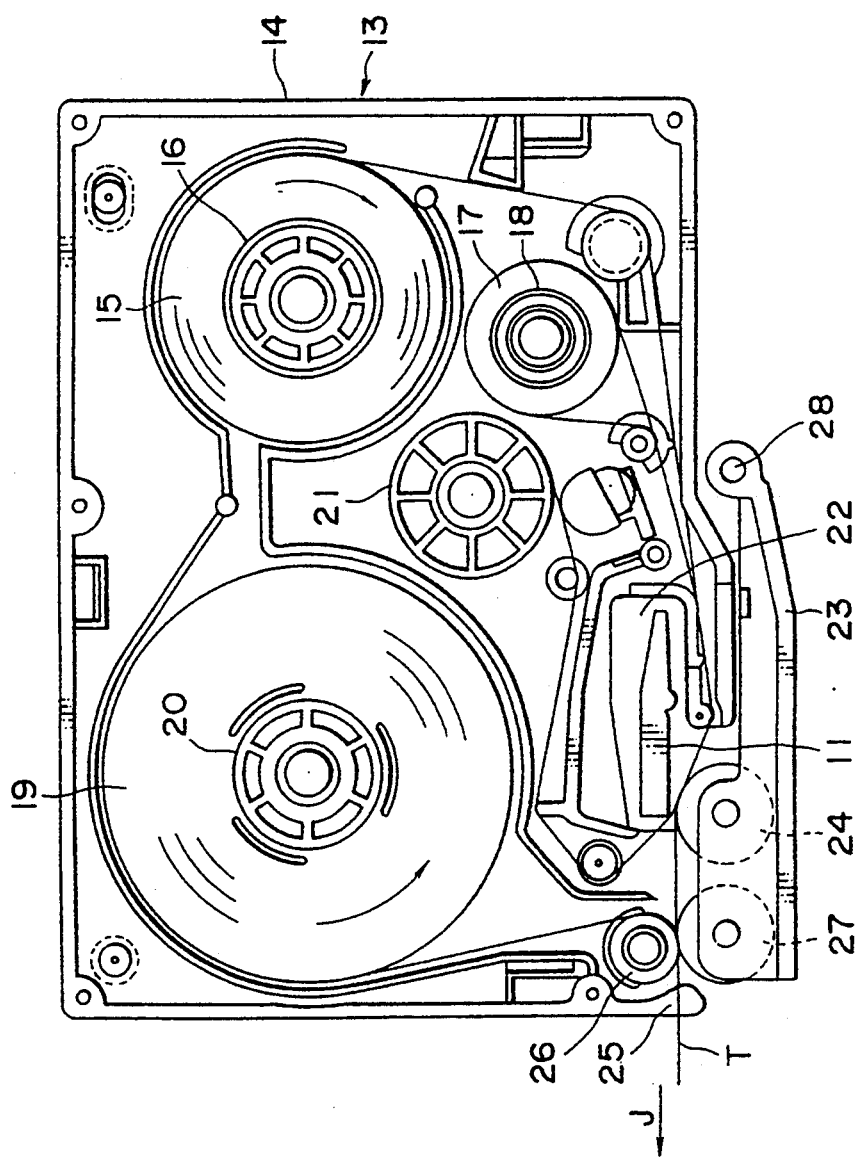
FIG. 2 is a top view showing the state that a tape cassette is accommodated in the cassette accommodation unit.

Next, the arrangement of the tape cassette 13 will be described with reference to FIG. 2. FIG. 2 is a top view showing the state that the tape cassette 13 is accommodated in the cassette accommodation unit 8 (the tape cassette 13 is shown by removing an upper case).

In FIG. 2, located in a lower case 14 is a tape spool 16 around which the transparent film tape 15 is wound: a ribbon spool 18 around which the thermal ink ribbon is wound; and an adhesive tape spool 20 around which a double sided adhesive tape 19 is wound with the release paper side thereof facing out. These spools 16, 18 and 20 are rotatably supported in cooperation with a support unit located on the lower surface of the upper case (not shown).

Further, the ribbon winding spool 21 is also rotatably supported among the respective spools 16, 18 and 20 in the same way and meshed with the aforesaid ribbon winding shall 9 to wind the thermal ink ribbon 17 used for printing by driving of the ribbon winding shaft 9.

Further, the aforesaid thermal head 11 is located in a recessed portion 22 defined to the lower case 14. A platen roller 24 rotatably supported by a roller holder 23 contacts the thermal head 11 at a location where the platen roller 24 can be pressed against the thermal heart 11. The thermal head 11 Includes many heating element sections (one hundred and twenty-eight in this embodiment) to print characters on the film tape 15 through the thermal ink ribbon 17.

Further, a tape press roller 26 is totally supported in the vicinity of a tape discharge unit 25 in the lower case (on the lower left side in FIGS. 1 and 2). The tape feed roller 27 rotatably supported by the roller holder 23 is positioned at a location such that it can be pressed against the tape press roller 26.

In the cassette accommodation unit 8, the roller holder 23 is rotatably supported by a support shaft 28 in front of the tape cassette 13 (on the lower side in FIGS. 1 and 2). The roller holder 23 can be switched between a print position and a release position by a manual changeover means (not shown). (FIGS. 1 and 2 show the state that it is in the print position).

The aforesaid platen roller 24 and tape feed roller 27 are rotatably attached to the roller holder 23 in such manner that when the roller holder 23 is switched to print position, the platen roller 24 and tape feed roller 27 are pressed against the thermal head 11 and press roller 26. Note, the tape feed roller 27 is rotated by the above tape feed roller shaft 10, and at the same time the press roller 26 is driven in rotation by a not shown gear mechanism in association with the tape feed roller 27.

Further, the press roller 26 cooperates with the tape Feed roller 27 to press the adhesive surface of the double sided adhesive tape 19 against the film tape 15 to which characters and the like are printed by the thermal head 11 through the thermal ink ribbon 17 so that a tape T is finally created and fed in the direction of an arrow J, shown in FIG. 2.

Next, the control system of the tape print device 1 arranged as described above will be described with reference to FIG. 3.

Figure 3:
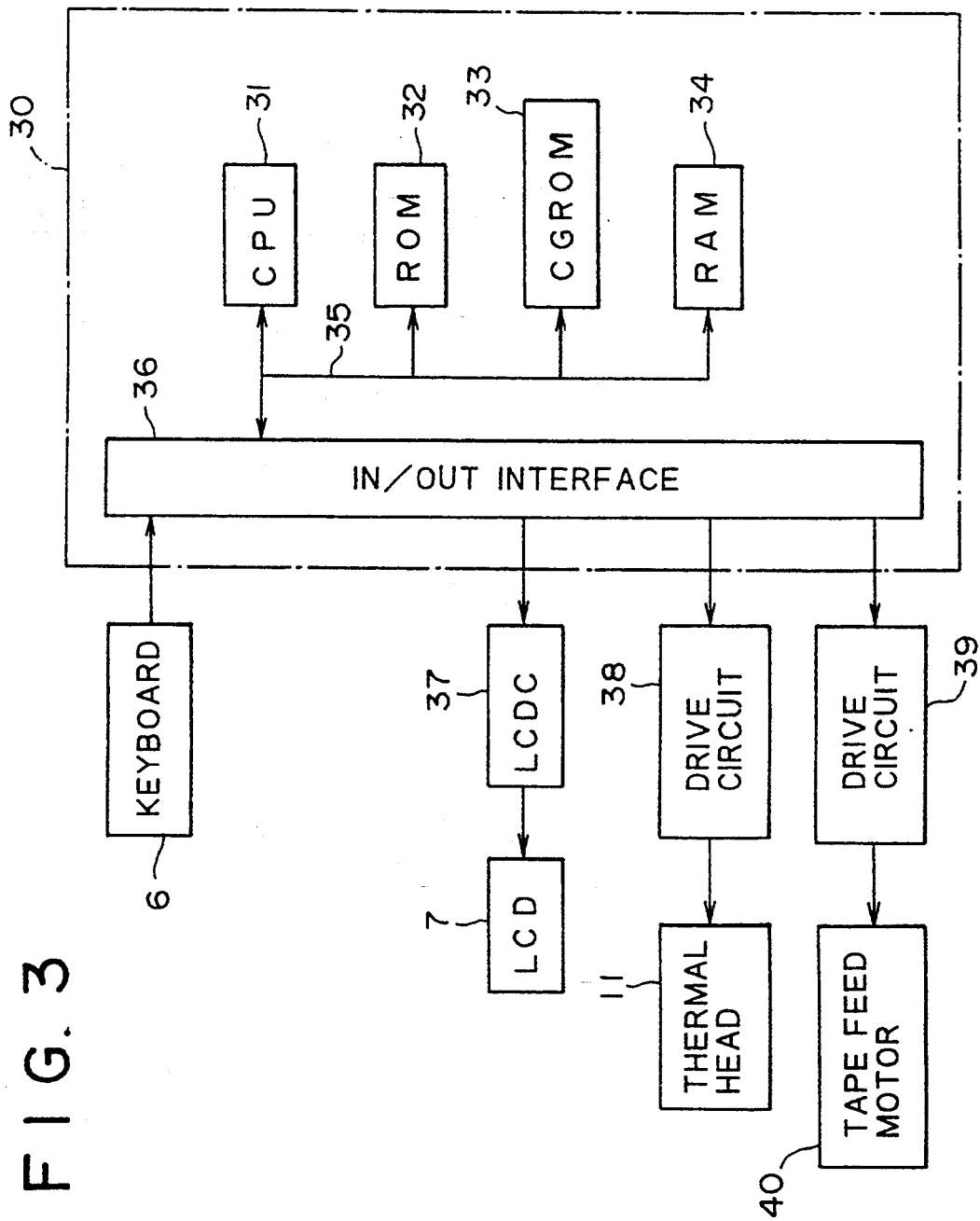
FIG. 3 is a control block diagram of the tape print device.

FIG. 3 shows a control block diagram of the tape print device 1 with a control unit 30 serving as a central unit. The control unit 30 is composed of a CPU 31 ROM 32, CGROM 33 and RAM 34 which are connected through a bus 35 and also connected to an I/O interface 36.

The ROM 32 stores various programs such as a tape print control program, print processing program, justify mode preparation processing program, and other various programs necessary to control the tape print device 1 (described later). Then, the CPU 31 executes arithmetic operations based on the various programs stored in the ROM 32.

Further, the CGROM 33 stores data indicating the widths corresponding to the various sizes of respective characters input from the keyboard 6, and the dot pattern data corresponding to the respective characters. Then, dot pattern data corresponding to a character input from the keyboard 6 is read from the CGROM 33 and transmitted to a developing buffer 43 (described later).

Further, the RAM 34 temporarily stores the result of the arithmetic operations executed by the CPU 31. The RAM 34 is provided with various memories as shown in FIG. 4.

Figure 4:
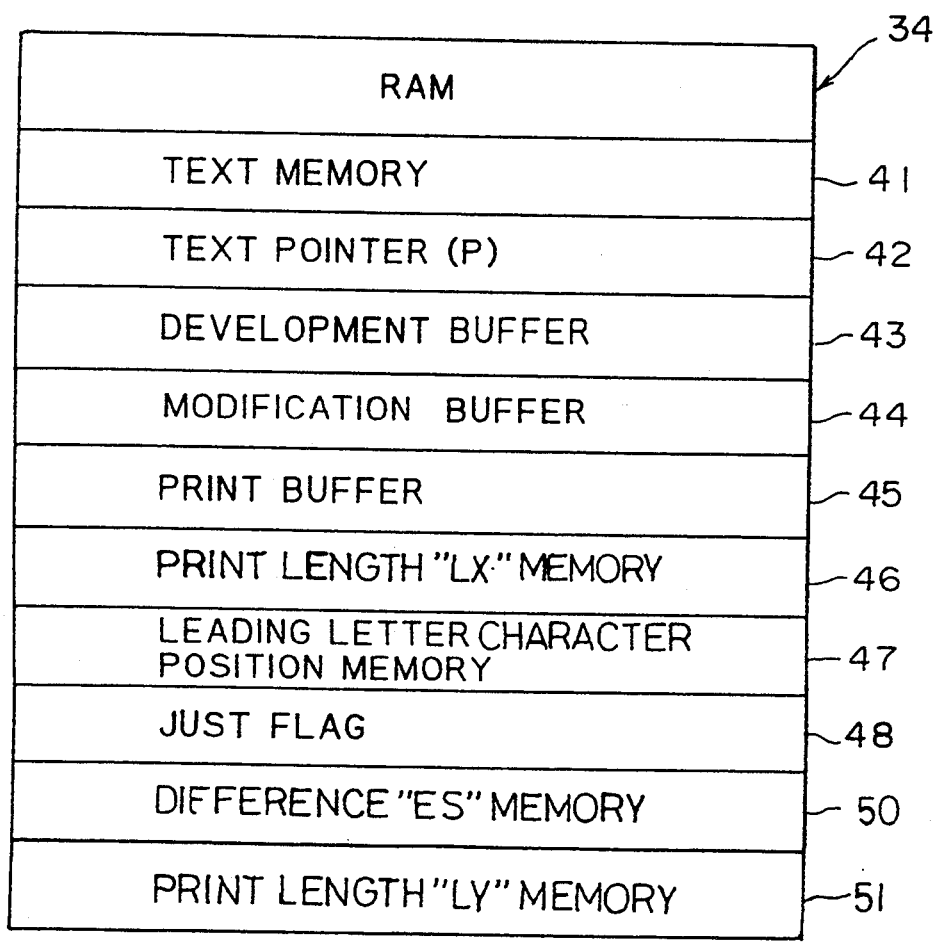
FIG. 4 is a diagram schematically explaining the content of a RAM.

In FIG. 4, a text memory 41 sequentially stores code data corresponding to characters input from the keyboard 6 as text data; a text pointer 42 indicates the memory region in the text memory 41 by a pointer value P; the development buffer 43 develops dot pattern data read out from the CGROM 33 corresponding to the character code data stored in the text memory 41 and stores the same there in; and further a modification buffer 44 stores the dot pattern data stored in the development buffer 43 and the dot pattern data modified by, character-size change processing and other processing.

Further, the dot pattern data stored in the modification buffer 44 is transferred to and stored in a print buffer 45 when the print operation is executed. The thermal head 11 executes dot pattern printing in accordance with the dot pattern data stored in the print buffer 45.

Further, a leading character position memory 47 stores the position data for a character located at the starting position of each line after calculation by the justify mode preparation processing. A flag 48 is set to "ON" when the justify mode setting key 4C is depressed and set to "OFF" when the key 4C is depressed again.

FIG. 3 further shows the keyboard 6, liquid crystal display unit 7 and display controller 37 connected to the control unit 30 through the I/O interface 36. When characters are input from the keyboard 6, the aforesaid character data is sequentially stored in the text memory 41 and a dot pattern representing the character input from the keyboard 6 is displayed on the liquid crystal display unit 7.

Further, the thermal head 11 is driven by a drive circuit 38 to print the dot pattern data transferred from the modification buffer 44 to the print buffer 45. The tape feed motor 40, synchronized with the print operation, controls the feed of the tape T through a drive circuit 39.

The operation of the tape print device arranged as per above, will be described with reference to FIGS. 5 through 8.

Figure 5:
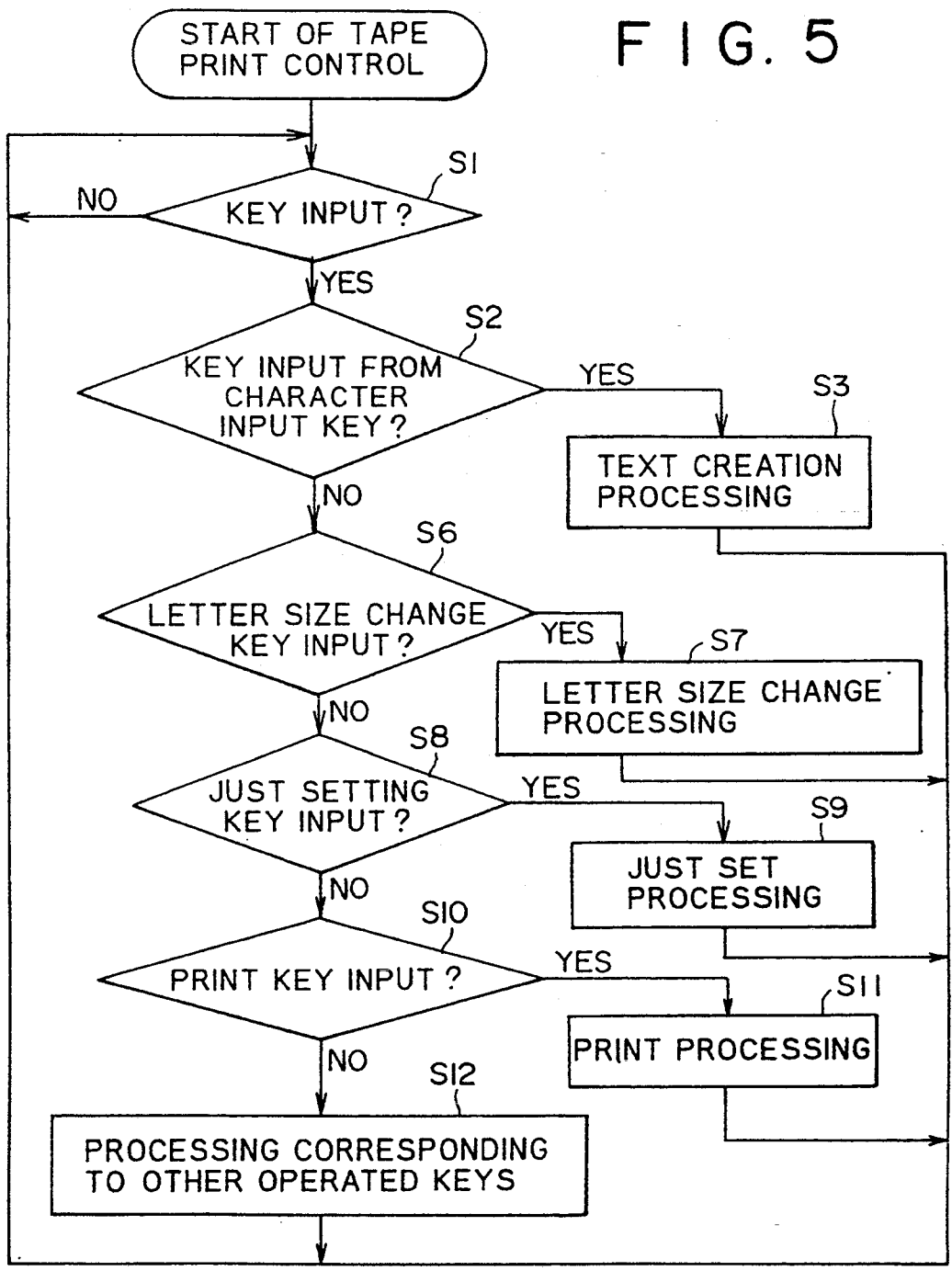
FIG. 5 is a flowchart of a tape print control program.

FIG. 5 is a flowchart of a tape print processing program. First, at step (hereinafter, abbreviated as S) it is determined whether a key input is executed from any key on the keyboard 6; the process waits until a key input is executed.

When the key input is executed from any key (S1: YES), the process advances to discriminate the kind of key input (S2, S6, S8, S10 and S12).

In case key Input is executed from the character size change key 4B, (S6: YES), character size change processing is executed at S7, and then the process returns to S1.

The character size change processing is executed in such a manner that the cursor is first moved to the character located at the left end of the character string whose character size is to be changed, and then the return key 5 is depressed. The cursor is then moved to the character located at the right end of the character string and then the return key 5 is depressed to designate the range in which the character size is changed.

Thereafter, numerals 1 through 4 and four kinds of character sizes corresponding to the numerals, i.e., a standard character size, double character size, half character size and quarter character size are displayed on the LCD unit 7. A character size is designated by depressing one of the numeral keys. Upon the completion of the designation, a mark indicating the character size change start position and a mark indicating the character size change end position are respectively displayed on the LCD unit 7 in front of and behind the character string whose character size is to be changed.

In the meantime, a point size such as 10 point, 12 point etc., may be designated as the character size by the numeral keys and the like, in addition to the designation of the above general character sizes.

In case key input is executed from the justify mode setting key 4C (S8: YES), the justify mode is started by setting the above flag 48 to "ON" at S9, and then the process returns to S1.

In case key input is executed from the print key (S10: YES), print processing (described later) is executed at S11, and then the process returns to S1. In case key input is other than one of those above, processing corresponding to the depressed key is executed at S12, and then the process returns to S1. The processing executed at 212 includes processing for setting the character size to the entire document data in the text memory 41.

Hereinafter, the print processing executed at S11 will be described with reference to FIGS. 5, 6, and 7. When the print key 3 is depressed, the print processing routine shown in FIG. 6 is called, and a processing routine shown in FIG. 7 is first executed (S20).

Figure 7:
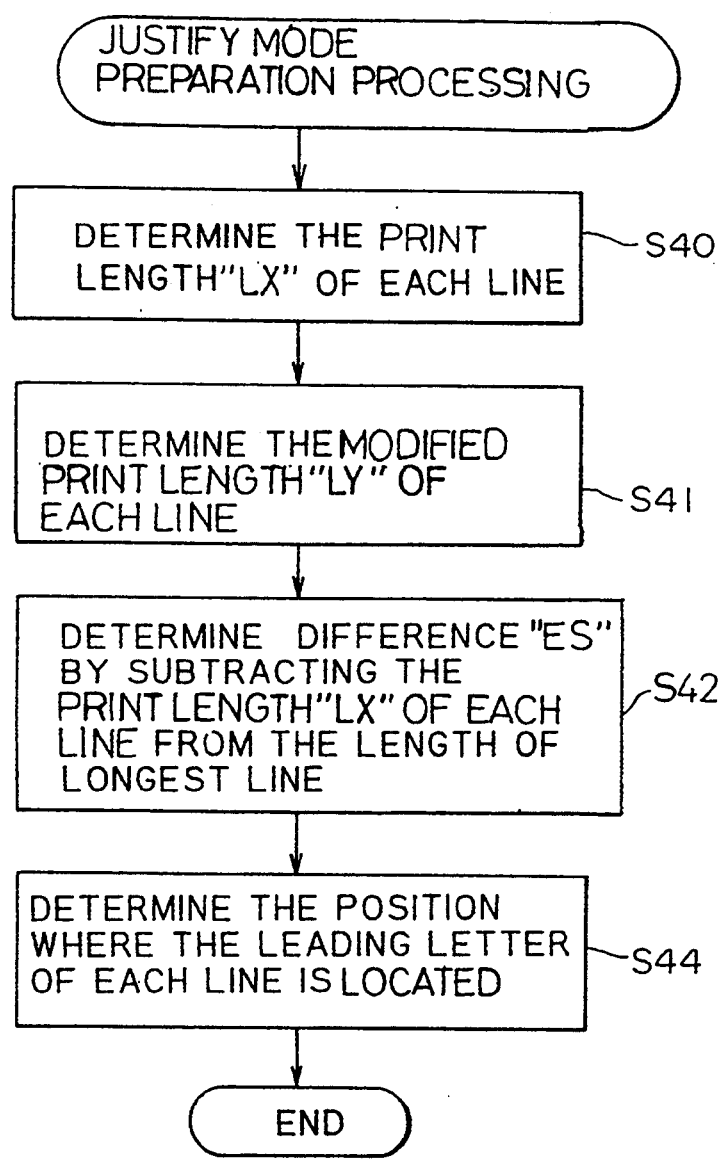
FIG. 7 is a flowchart of the justification preparation processing program.

In the processing routine, shown in FIG. 7, first at S40, the character width data stored in the CGROM read out for each character stored in the text memory 41 to determine the print length "LX" of each line delimited by a line feed code. The print length "LX" is stored in the print length "LX" memory 46 of the RAM 34. At the same time, the point size of the character code located at the leading end of each line is stored in the RAM 34.

At S41, the modified print length "LY" is determined for each line, by subtracting the print width of the rightmost character on a line from the print length "LX" of the respective line. This modified print length "LY" is stored in the print length "LY" memory 51.

Next, at S42, the print length of the longest line is detected and the print length "LX" of each line is subtracted from the print length "LL" of the longest line to determine the difference in length. "ES", for each line. The difference "ES" is stored in the difference "ES" memory 50.

Subsequently, at S44, a location of the leading character of each line is determined, so that the leading character is located at the same horizontal position as the leading character of the longest line, in the justify processing. Data regarding the position of the leading character, determined as above, is stored in the leading character position memory 47. Thus, the justify mode preparation processing is completed.

In FIG. 6, after completion of the justify mode preparation processing executed at S20, a pointer value P in the text pointer 42 is set to the leading address of the text at S21. For the second and subsequent lines the pointer value P of the text pointer 42 is set behind the line feed code of the previous line.

At S22, it is discriminated whether the pointer value P indicates the location where the leading character of the line is stored in the text memory 41. When the pointer value P coincides with the pointer value indicating the line head stored in the RAM 34 at S40 (S22: YES), the position where the leading character for each line is located is read from the leading character position memory 47, at S24. The process then goes to S25.

In case the pointer value P does not indicate the line head at (S22: NO), the process advances directly to S25.

At S25, the data indicated by the pointer value P of the text pointer 42 is read from the text buffer 41.

At S30, the dot pattern data corresponding to the character code is read from the CGROM 33 and developed on the development buffer 43. Then, the developed dot pattern data is transferred to the modification buffer 44 and changed to the dot pattern data of the character size set in the modification buffer 44. This dot pattern data is transferred to the disposing position on the print buffer 45 stored in the RAM 34.

Further, when the character size change start code is read, a code included in the read code for indicating the set character size is temporarily stored in the RAM 34, and dot pattern data for this set character size is then created for the character codes read after the character size change start code, at S25. When the character size change end code is read, the code indicating the above set character size, temporarily stored in the RAM 34, is deleted. The dot pattern data of the character size set for the entire text data then created for the character codes read after the character size change end code, at S25.

At S31, it is discriminated whether the flag 48 is "ON", (ie., whether the justify mode is employed. If flag 48 is "ON" (S31: YES) at S32, the location of the next character (after the character indicated by the text pointer 42) is set to a position advanced by the print width of a character indicated by the equation:

(Difference "ES"/Print length "LY")×Print width of the character designated by P.

Thus when justification Is executed, the space to be inserted between adjacent characters is determined based upon the print width (and therefore the character size) of the character after which the space is to be put.

Thereafter, the process goes to S33. It is noted that if the flag 48 is not "ON" (S31: NO), the process directly to S33.

Until the pointer value P of the text pointer 42 comes to the final position (S33: YES) the pointer value P the text pointer 42 is incremented by 1 at S35 to execute the aforesaid processing on the next character. Then the content of the print buffer 45 is printed on the film tape 15 through the thermal head 11 at S34.

Figure 8A:
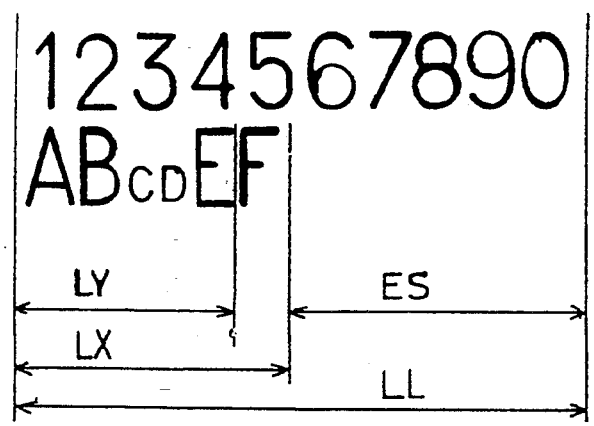
FIG. 8(A) is a diagram explaining print length data at the time a justify space amount is determined.

For instance, FIG. 8(B) shows a print example where only the characters "D E F" located at the intermediate portion of a line are printed with the quarter size. The entire line is justified according to the aforesaid processing.

As described above in detail, the tape print device according to the present embodiment designates the range of the line or lines of characters that are to be modified, of a plurality of lines input from the keyboard 6 by using the cursor key K and the return key 5. When the characters modified by the character size change in the designated modification range are to be justified, the difference between the length of the longest line of the plurality of lines and the length of the line containing the designated modification range is determined. The difference in length is distributed to each pair of adjacent characters depending upon the character size thereof, so that even if characters having different sizes are mixed on a line, all the characters can be properly justified.

Thus with this arrangement, even when justification is executed while executing character size change modification for characters, a tape T having a balanced character appearance can be made.

It should be noted, however, that the above description is one embodiment of the present invention. Other embodiments are not explicitly described, but can anticipated from this embodiment.

What is claimed is:

1. A wordprocessing device wherein characters having a first size add a second size different from said first size are able to be mixedly arranged on a line, said device comprises:

justifying means for justifying a plurality of characters over a plurality of lines by inserting additional spaces that includes a first space and a second space different from said first space between respective pairs of adjacent characters on respective lines to be justified wherein the second character size is smaller than the first character size and the second space is smaller than the first space and said second means determines said second space is to be inserted between an adjacent pair of characters when both characters of said pair of adjacent characters are the second size;

first means for determining a total space to be distributed over each line of said plurality of lines; and second means for determining the first and second space for the additional space to be inserted between each pair of characters on each line based upon the total space determined by said first determining means in accordance with the first and second size of the character sizes of said pair of characters.

2. The wordprocessing device according to claim 1 wherein said second determining means determines said additional space based upon the character size of the former character of said pair of characters.

3. The wordprocessing device according to claim 2 wherein said first means further comprises:

detecting means for detecting the length of the longest one of said plurality of lines;

first arithmetic means for determining the total space by subtracting the length of each line from the length of said longest line, and wherein said second means further comprises:

second arithmetic means for determining the additional space by dividing said total space by the length of said line excluding the last character on said line, the quotient of which is multiplied by the length of said former character of said character pair.

4. The wordprocessing device according to claim 1 which Further comprises:

designation means for designating a range of characters input by said input means; and character size changing means for changing the character size of said designated range of characters.

5. The wordprocessing device according to claim 4 wherein said second determining means determines said additional space based upon the character size of the former character of said pair of characters.

6. The wordprocessing device according to claim 5 wherein said first means further comprises:

detecting means for detecting the length of the longest one of said plurality of lines;

first arithmetic means for determining the total space by subtracting the length of each line from the length of said longest line, and wherein said second means further comprises:

second arithmetic means for determining the additional space by dividing said total space by the length of said line excluding the last character on said line, the quotient of which is multiplied by the length of said former character of said character pair.

7. The wordprocessing device according to claim 1 which further comprises a print means for printing said characters on a recording medium.

8. The wordprocessing device according to claim 7 wherein said recording medium is a tape housed in a removable cassette.

9. The wordprocessing device according to claim 1 wherein each of the first and second size is determined based upon the length of each character in a line in a direction along the line.

* * * * *